(12) United States Patent
Koppe et al.

(10) Patent No.: US 9,722,400 B2
(45) Date of Patent: Aug. 1, 2017

(54) APPLICATION AND MAINTENANCE OF TENSION TO TRANSMISSION LINE IN PIPE

(71) Applicants: Michael Koppe, Lachendorf (DE); Stephan Mueller, Hannover (DE); Ingo Roders, Seelze (DE); Rene Schulz, Lower Saxony (DE); Henning Rahn, Celle (DE); Robert Buda, Lower Saxony (DE); Detlev Benedict, Celle (DE); Julia Reisewitz, Celle (DE); Helmut Floerke, Celle (DE)

(72) Inventors: Michael Koppe, Lachendorf (DE); Stephan Mueller, Hannover (DE); Ingo Roders, Seelze (DE); Rene Schulz, Lower Saxony (DE); Henning Rahn, Celle (DE); Robert Buda, Lower Saxony (DE); Detlev Benedict, Celle (DE); Julia Reisewitz, Celle (DE); Helmut Floerke, Celle (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 942 days.

(21) Appl. No.: 13/929,470

(22) Filed: Jun. 27, 2013

(65) Prior Publication Data
US 2015/0000957 A1    Jan. 1, 2015

(51) Int. Cl.
*E21B 17/00*    (2006.01)
*H02G 3/02*    (2006.01)
(Continued)

(52) U.S. Cl.
CPC ............. *H02G 3/02* (2013.01); *E21B 17/003* (2013.01); *E21B 17/206* (2013.01); *H02G 1/06* (2013.01); *Y10T 29/49826* (2015.01)

(58) Field of Classification Search
CPC . H02G 3/02; H02G 1/00; H02G 15/24; E21B 17/206; E21B 17/003;
(Continued)

(56) References Cited

U.S. PATENT DOCUMENTS

| 3,518,608 A | 6/1970 | Papadopoulos |
| 5,086,196 A | 2/1992 | Brookbank et al. |

(Continued)

FOREIGN PATENT DOCUMENTS

EP    1094194 A2    4/2001

OTHER PUBLICATIONS

Notification of Transmittal of the International Search Report and the Written Opinion of the International Searching Authority, or the Declaration; PCT/US2014/039890; Sep. 29, 2014, 12 pages.

(Continued)

*Primary Examiner* — Yong-Suk (Philip) Ro
(74) *Attorney, Agent, or Firm* — Cantor Colburn LLP

(57) ABSTRACT

A method for providing tension to a data or power transmission line in a pipe includes inserting a transmission line into a transmission line channel of a pipe. The transmission line has a first end and a second end and is inserted into a first end of the pipe second-end-first and has a first tension-load-supporting mechanism attached to the first end of the transmission line. The method includes applying a first level of tension to the transmission line in the pipe and applying a second tension-load-supporting mechanism to the second end of the transmission line while the first level of tension is applied to the transmission line. The method further includes removing the first level of tension from the transmission line to maintain a second level of tension along the transmission line between the first and second tension-load-supporting mechanisms.

21 Claims, 22 Drawing Sheets

(51) Int. Cl.
*E21B 17/20* (2006.01)
*H02G 1/06* (2006.01)

(58) Field of Classification Search
CPC ...... E21B 17/928; E21B 47/122; E21B 17/02; E21B 47/12; Y10T 29/49826; F16L 15/003; F16L 15/009; H01R 13/523; H01R 13/6633; H01R 24/566; H01F 38/14
See application file for complete search history.

(56) References Cited

U.S. PATENT DOCUMENTS

| | | | |
|---|---|---|---|
| 5,122,209 | A | 6/1992 | Moore et al. |
| 5,745,047 | A | 4/1998 | Van Gisbergen et al. |
| 5,894,104 | A | 4/1999 | Hedberg |
| 6,982,384 | B2 | 1/2006 | Hall et al. |
| 7,190,280 | B2 | 3/2007 | Hall et al. |
| 7,224,289 | B2 | 5/2007 | Bausov et al. |
| 2002/0193004 | A1* | 12/2002 | Boyle ............... E21B 17/028 439/577 |
| 2004/0079737 | A1 | 4/2004 | Pinchasik |
| 2004/0149471 | A1 | 8/2004 | Hall et al. |
| 2004/0150532 | A1 | 8/2004 | Hall et al. |
| 2004/0177956 | A1 | 9/2004 | Boyadjielf |
| 2005/0118848 | A1 | 6/2005 | Hall |
| 2005/0145406 | A1 | 7/2005 | Hall et al. |
| 2006/0021799 | A1 | 2/2006 | Hall et al. |
| 2007/0169929 | A1 | 7/2007 | Hall et al. |
| 2008/0106433 | A1 | 5/2008 | Madhavan et al. |
| 2010/0108382 | A1 | 5/2010 | Ma et al. |
| 2010/0111592 | A1 | 5/2010 | Hassell et al. |
| 2011/0108267 | A1 | 5/2011 | Chaize |
| 2011/0240372 | A1 | 10/2011 | Davis |
| 2011/0308807 | A1 | 12/2011 | Spencer |
| 2012/0211235 | A1 | 8/2012 | Smith |
| 2014/0102806 | A1 | 4/2014 | Millet et al. |
| 2014/0144699 | A1 | 5/2014 | Mueller |
| 2014/0352941 | A1 | 12/2014 | Mueller |

OTHER PUBLICATIONS

Shah, et al. "Design Considerations for a New High Data Rate LWD Acoustic Telemetry System" SPE 88636. SPE Asia Pacific Oil and Gas Conference and Exhibition held in Perth, Australia, Oct. 18-20, 2004. 7 pages.
Notification of Transmittal of the International Search Report and the Written Opinion of the International Searching Authority; PCT/US2014/04450; Mailed Oct. 27, 2014; 18 pages.
Notification of Transmittal of the International Preliminary Report on Patentability and the Written Opinion of the International Searching Authority, or the Declaration; PCT/US2013/071182; Jun. 11, 2015, 10 pages.

* cited by examiner

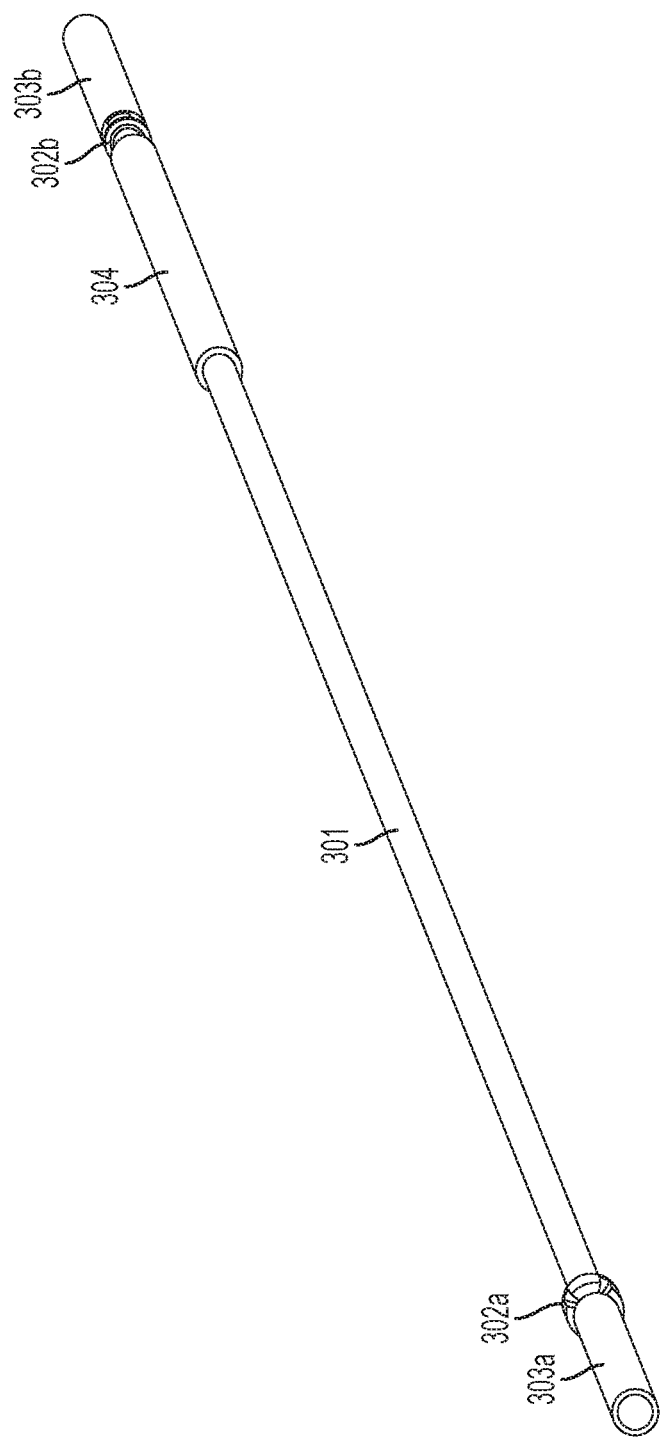

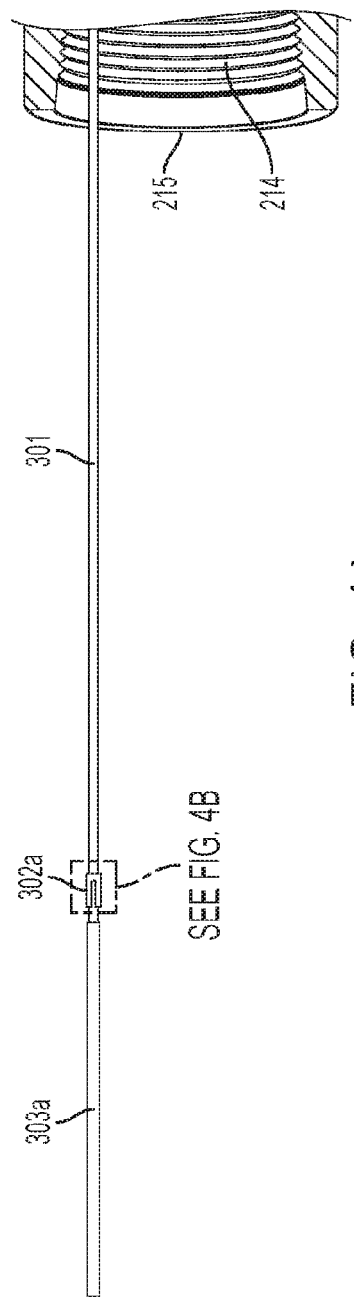
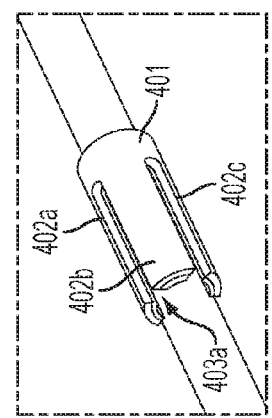
FIG. 4A
FIG. 4B

APPLICATION AND MAINTENANCE OF TENSION TO TRANSMISSION LINE IN PIPE

BACKGROUND OF THE INVENTION

In oil and gas drilling and completion systems, power and data are communicated between downhole devices and uphole devices via transmission lines that extend along well pipes. When the transmission lines are slack in the well pipe, they may be damaged by fluids and debris flowing through the well pipe.

BRIEF DESCRIPTION OF THE INVENTION

Disclosed herein is a method for providing tension to a transmission line in a pipe. The method includes inserting a transmission line into a transmission line channel of a pipe. The transmission line has a first end and a second end, the transmission line being inserted into a first end of the pipe second-end-first. The transmission line has a first tension-load-supporting mechanism attached to the first end of the transmission line. The method includes applying a first level of tension to the transmission line in the pipe and applying a second tension-load-supporting mechanism to the second end of the transmission line while the first level of tension is applied to the transmission line. The method further includes removing the first level of tension from the transmission line to maintain a second level of tension along the transmission line between the first and second tension-load-supporting mechanisms.

Further disclosed herein is a pipe assembly. The pipe assembly includes a pipe having a main cavity extending through the pipe along a longitudinal axis and a transmission line channel located radially outward from the main cavity and extending through the pipe substantially parallel to the longitudinal axis. The transmission line channel has a first shoulder at a first end of the transmission line channel and a second shoulder at a second end of the transmission line channel. The transmission line assembly includes a transmission line extending along the transmission line channel, a first tension-load-bearing mechanism at a first end of the transmission line and a second tension-load-bearing mechanism at a second end of the transmission line. The first tension-load-bearing mechanism and the second tension-load-bearing mechanism are configured to press against the first shoulder and the second shoulder, respectively, to maintain a tension along the transmission line.

BRIEF DESCRIPTION OF THE DRAWINGS

The following descriptions should not be considered limiting in any way. With reference to the accompanying drawings, like elements are numbered alike:

FIG. 3 illustrates a transmission line according to an embodiment of the invention;

FIG. 4 illustrates the insertion of a transmission line into a pipe according to an embodiment of the invention;

DETAILED DESCRIPTION OF THE INVENTION

A detailed description of one or more embodiments of the disclosed apparatus and method are presented herein by way of example and not limitation with reference to the Figures.

Figure 1:
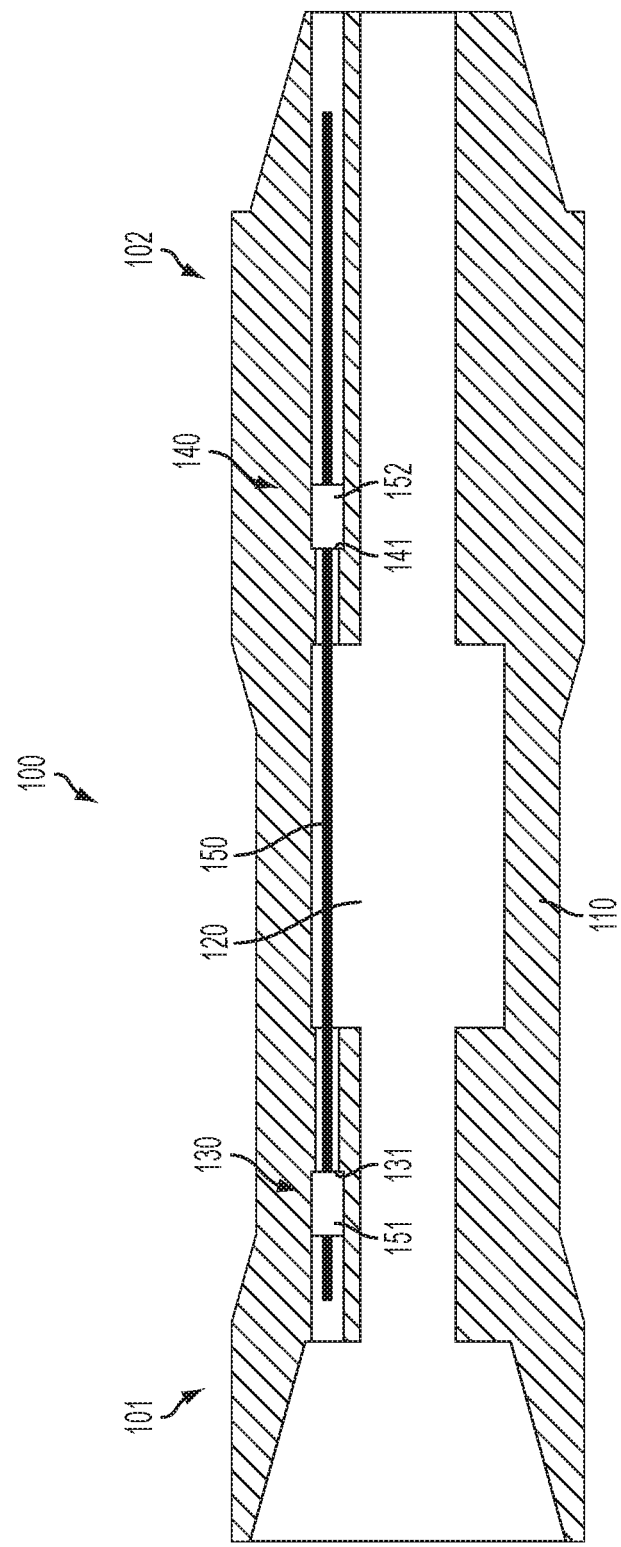
FIG. 1 illustrates a pipe segment according to an embodiment of the invention.

FIG. 1 illustrates a pipe segment 100 according to an embodiment of the invention. The pipe segment 100 may be a well pipe segment configured to connect to other well pipe segments to form a pipe in an oil well, or the pipe segment 100 may perform any other purpose. The pipe segment 100 includes a pipe body 110 that defines a main cavity 120. The main cavity 120 extends the length of the pipe segment 100 and is configured to permit fluid flow through the pipe segment 100. In embodiments of the invention, the main cavity 120 is coaxial with the pipe body 110.

The pipe body 110 includes a first end 101 and a second end 102. In FIG. 1, the first end 101 has a box configuration and the second end 102 has a pin configuration. The pin end is configured to fit into a box end of an adjacent pipe segment. The pipe segment 100 also includes at least one transmission line cavity. In FIG. 1, a first transmission line cavity 130 is located at the first end 101, and a second transmission line cavity 140 is located at the second end 102. The transmission line cavities 130 and 140 have diameters smaller than the main cavity 120 and are configured to receive a transmission line 150. In embodiments of the invention, the pipe body 110 includes a first shoulder 131 in the first transmission line cavity 130 and a second shoulder 141 in the second transmission line cavity 140. The transmission line 150 includes a first tension-load-supporting mechanism 151 that is affixed to the transmission line 150, such as by welding, by use of a shape memory material, clamping sets, glue, solder, bolts-and-nuts, expansion mandrels, or by use of any other fixing means. A diameter of the first tension-load-supporting mechanism 151 is sufficiently large such that an end of the first tension-load-supporting mechanism 151 contacts the first shoulder 131. Likewise, the transmission line 150 includes a second tension-load-supporting mechanism 152 that is affixed to the transmission line 150, such as by welding, by use of a shape memory material, clamping sets, glue, solder, bolts-and-nuts, expansion mandrels, or by use of any other fixing means. A diameter of the second tension-load-supporting mechanism 152 is sufficiently large such that an end of the second tension-load-supporting mechanism 152 contacts the second shoulder 141. During installation of the transmission line 150 in the pipe body 110, tension force is applied to the transmission line 150, such that when the tension force is released, the first and second tension-load-supporting mechanism 151 and 152 maintain tension in the transmission line 150 as they press against the first and second shoulders 131 and 141, respectively.

Figure 2A:
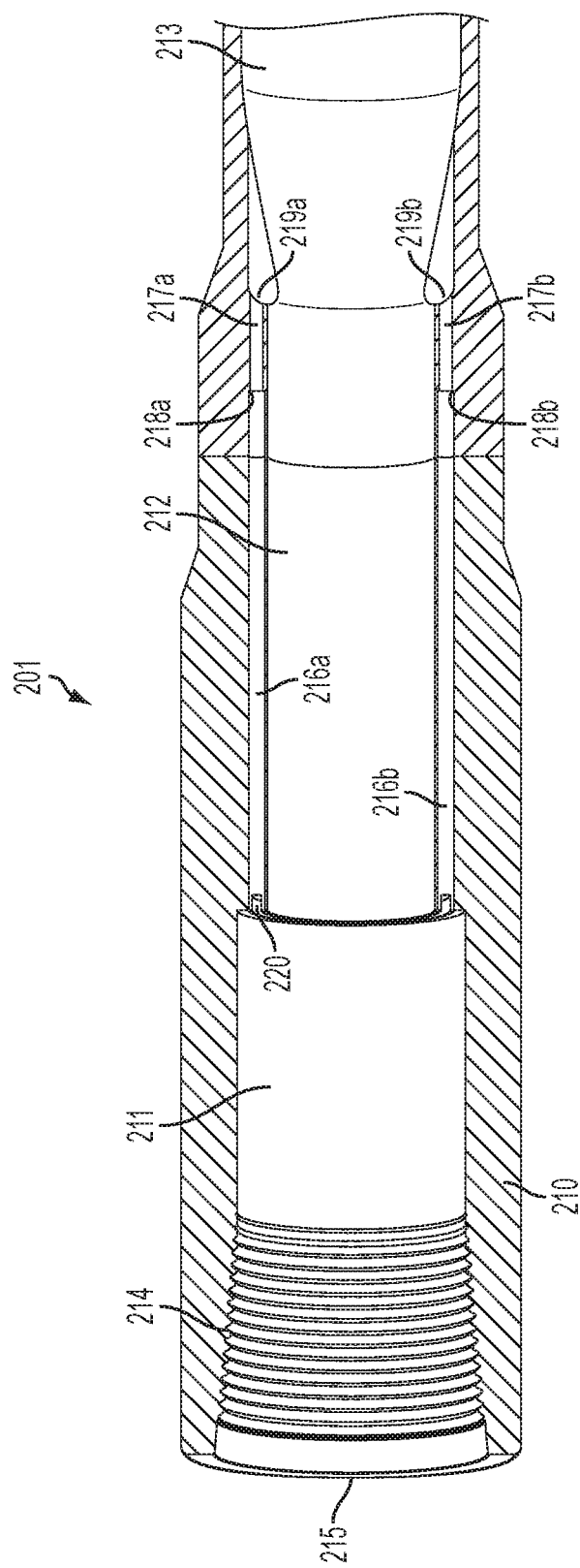
FIG. 2A illustrates one end of a pipe segment according to an embodiment of the invention.
Figure 2B:
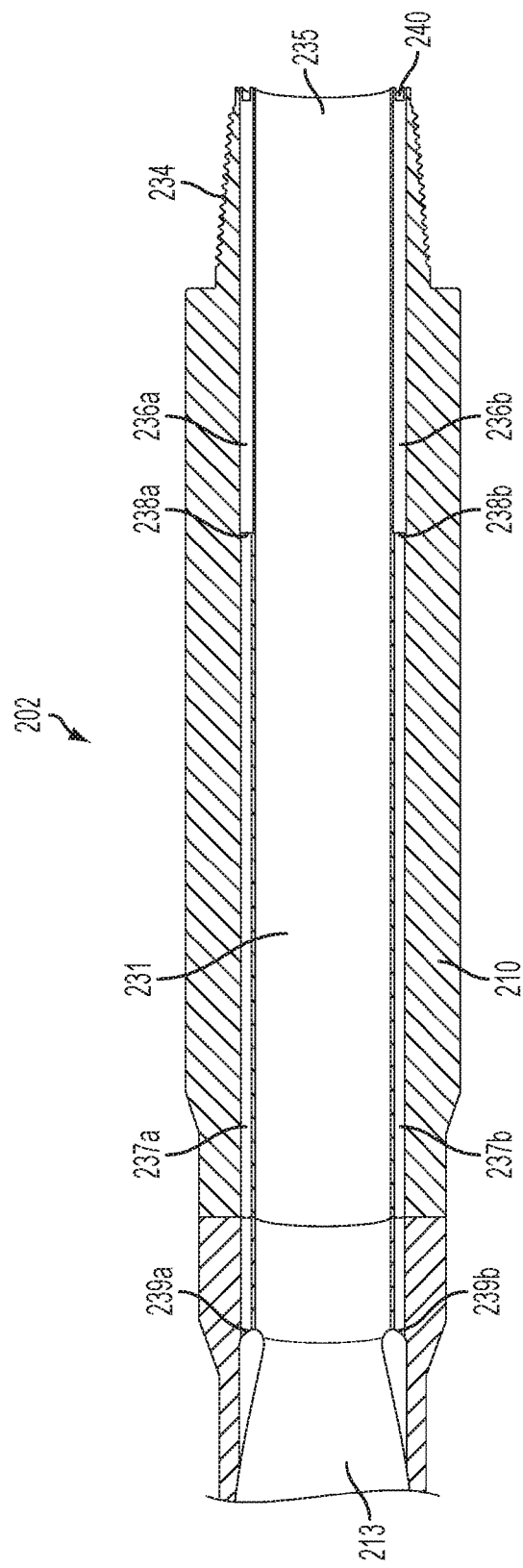
FIG. 2B illustrates another end of a pipe segment according to an embodiment of the invention.

Referring to FIGS. 2A and 2B, a well pipe 210 has a first end 201 and a second end 202. The well pipe 210 may correspond to the well pipe 110 of FIG. 1. The first end 201 may have a box configuration and the second end 202 may have a pin configuration. The well pipe 210 defines a main cavity, which may include first and second portions 211 and 212 at the first end 201, the first and second portions 211 and 212 having different diameters, a center portion 213 between the first end 201 and the second end 202, and a third portion 231 at the second end 202. While four different main cavity portions 211, 212, 213 and 231 are illustrated in FIGS. 2A and 2B, embodiments of the invention encompass well pipes 210 having any number of main cavity portions having any variety of diameters.

The first end 201 may include a threaded portion 214 adjacent to the end surface 215, and the second end 202 may include a threaded portion 234 adjacent to the end surface 235 of the second end 202. The threaded portion 214 of the first end 201 may be configured to securely engage with the threaded portion 234 of the second end 202 of an adjacent pipe segment, such that multiple pipe segments may be connected with a fluid-tight seal end-to-end.

The first end 201 includes a first transmission line channel having a first channel portion 216a and a second channel portion 217a. The first channel portion 216a and the second channel portion 217a are co-axial, and the first channel portion 216a has a diameter greater than the second channel portion 217a, such that a shoulder 218a is located at one end of the first channel portion 216a where the first channel portion 216a connects to the second channel portion 217a. The first end 201 also includes a second transmission line channel having a third channel portion 216b and a fourth channel portion 217b with a shoulder 218b between the third and fourth channel portions 216b and 217b. The second channel portion 217a has an opening 219a that opens to the main cavity portion 213, and the fourth channel portion 217b has an opening 219b that opens to the main cavity portion 213. While an embodiment of the invention is illustrated with the openings 219a and 219b, in another embodiment, a transmission line channel extends from one end of the drill pipe 210 to the other entirely within the wall of the drill pipe 210, without opening to the main cavity portion 213.

Referring to FIG. 2B, the second end 202 includes a third transmission line channel having a fifth channel portion 236a and a sixth channel portion 237a that are co-axial. The fifth channel portion 236a has a diameter that is larger than the sixth transmission line portion 237a, and a shoulder 238a is located at the end of the fifth channel portion 236a adjacent to the sixth channel portion 237a. The second end 202 also includes a fourth transmission line channel including a seventh channel portion 236b, an eighth channel portion 237b and a shoulder 238b separating the seventh and eighth channel portions 236b and 237b. The sixth channel portion 237a has an opening 239a that opens to the center main channel portion 213, and the eighth channel portion 237b has an opening 239b that opens to the center main channel portion 213.

The second end 202 also includes a groove 240 at the end surface 235, and the fifth and seventh channel portions 236a and 236b open into the groove 240. It should be noted that a similar groove may be present at the first end surface 215 of the first end 201 illustrated in FIG. 2A.

In embodiments of the invention, the first through eighth channel portions 216a, 216b, 217a, 217b, 236a, 236b, 237a and 237b are formed in the well pipe 210 radially outward from the main channel of the pipe 210. For example, as illustrated in FIG. 2A, the first, second, third and fourth channel portions 216a, 216b, 217a and 217b are located in the pipe 210 radially outward from the second portion 212 of the main channel. Similarly, as illustrated in FIG. 2B, the fifth, sixth, seventh and eighth channel portions 236a, 237a, 236b and 237b are located in the wall of the pipe 210 radially outward from the third portion 231 of the main channel. The first through eighth channel portions 216a, 216b, 217a, 217b, 236a, 236b, 237a and 237b are physically separated from the second main channel portion 212 and the third main channel portion 231, respectively, by a wall of the well pipe 210.

Although two transmission line channels are illustrated in each of FIGS. 2A and 2B, embodiments of the invention encompass well pipes 210 having any number of transmission line channels, from as few as one transmission line channel, to as many transmission line channels are desired according to design considerations of a particular well pipe.

FIG. 3 illustrates a transmission line assembly 300 according to an embodiment of the invention. The transmission line assembly 300 includes a transmission line 301, a first axial load sleeve 302a at a first end of the transmission line 301 and a second axial load sleeve 302b at a second end of the transmission line 301. A first sealing sleeve 303a is located on the transmission line 301 at the first end of the transmission line 301, and a second sealing sleeve 303b is located on the transmission line 301 at the second end of the transmission line 301. The transmission line assembly 300 also includes a stabilizer sleeve 304. The first and second axial load sleeves 302a and 302b are fixed with respect to the transmission line 301. For example, in one embodiment the first and second axial load sleeves 302a and 302b are welded onto the transmission line 301. The first and second axial load sleeves 302a and 302b are configured to receive a force in a direction along the length of the transmission line 301, having a vector from a center of the transmission line 301 outward toward the ends of the transmission line 301. Since the axial load sleeves 302a and 302b are fixed with respect to the transmission line 301, they maintain tension along the transmission line 301 in response to receiving the force in the direction along the length of the transmission line 301. The first and second axial load sleeves 302a and 302b, the first and second sealing sleeves 303a and 303b and the stabilizer sleeve 304 are described in further detail in reference to the figures that follow.

FIG. 4 illustrates the insertion of the transmission line 301 into the opening defined by the end surface 215 of the well pipe 210. In particular, the second end of the transmission line 301 is inserted into the well pipe 210. The first axial load sleeve 302a is attached to the first end of the transmission line 301. The first axial load sleeve 302a includes a base portion 401 and axially-protruding portions 402a, 402b and 402c separated by spaces 403a and 403b. In one embodiment, the first axial load sleeve 302a is welded to the transmission line 301. The sealing sleeve 303a encircles the transmission line 301 at the first end of the transmission line 301 to prevent fluid flow into the first transmission line channel.

Figure 5:
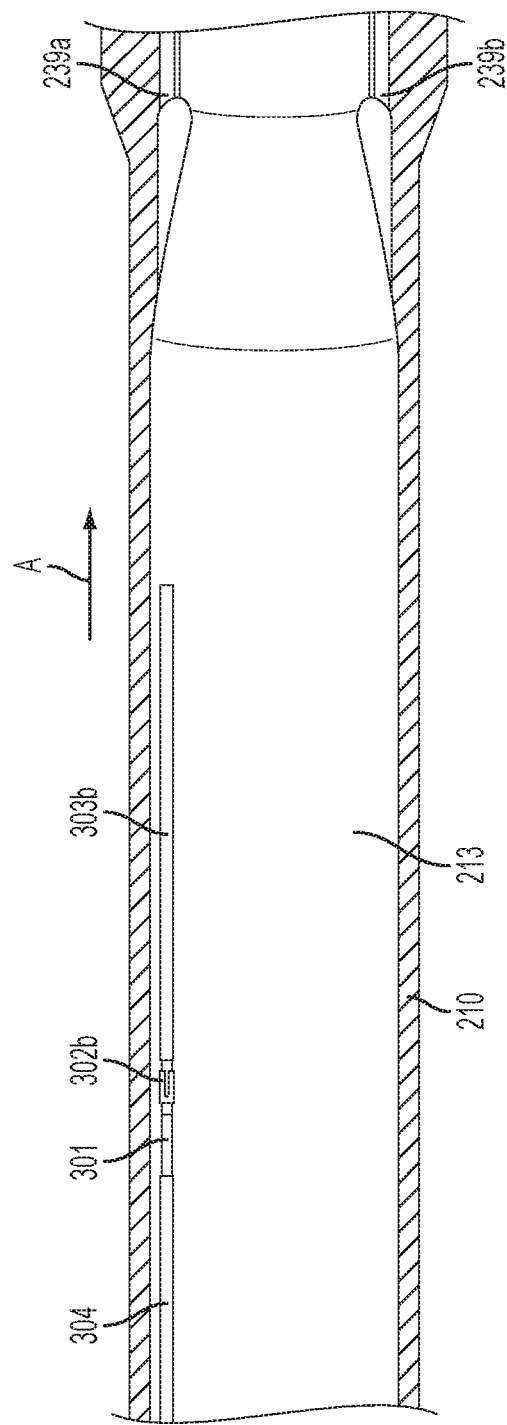
FIG. 5 illustrates the insertion of the transmission line into the pipe according to an embodiment of the invention.

Similarly, as illustrated in FIG. 5, the second end of the transmission line 301 includes an axial load sleeve 302b and the sealing sleeve 303b surrounding the transmission line 301. The stabilizer sleeve 304 encircles the transmission line 301 on an opposite side of the axial load sleeve 302b from the second sealing sleeve 303b. The stabilizer sleeve 304 is used to push the second axial load sleeve 302b through the well pipe 210, and in particular in the direction A towards and into the opening 239a.

Figure 6:
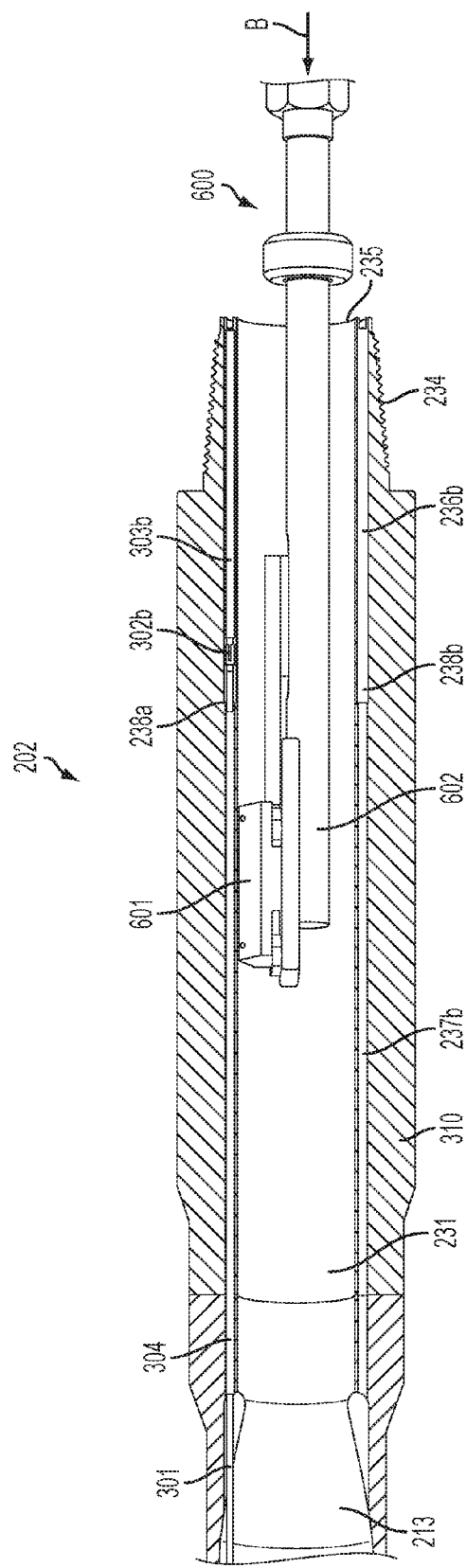
FIG. 6 illustrates the insertion of a tension-generating device into a pipe according to an embodiment of the invention.

As illustrated in FIG. 6, a tension-generating device 600 is inserted into the second end 202 of the well pipe 210 in the direction B. The tension-generating device 600 includes a grip portion 601 and an extended portion 602. The grip portion 601 is located at an end of the extended portion 602. The extended portion 602 may be controlled by a control mechanism external to the well pipe 210 to grip and un-grip the transmission line 301.

Figure 7A:
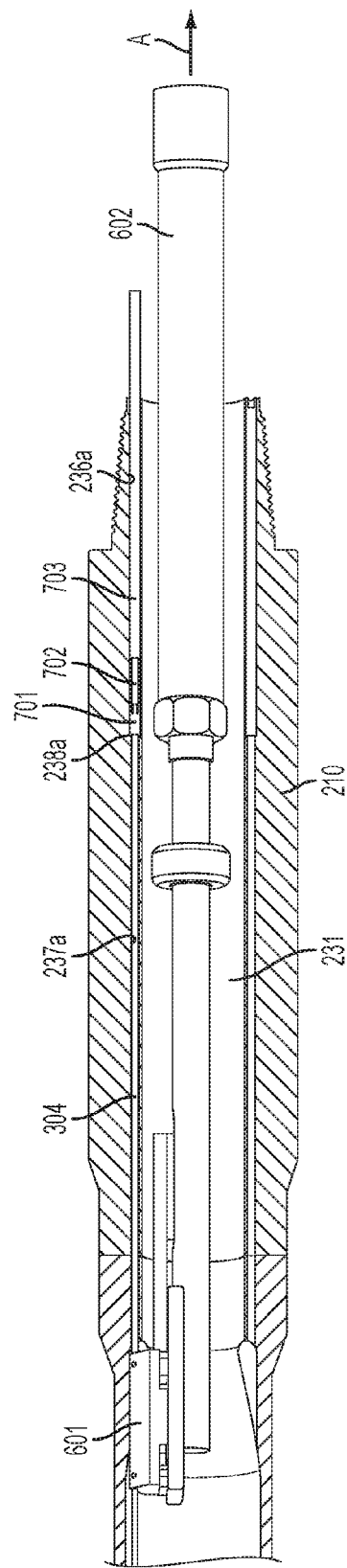
FIG. 7A illustrates the generation of tension in a transmission line according to an embodiment of the invention.

FIG. 7A illustrates the grip portion 601 of the tension-generating device 600 gripping the transmission line 301 and pulling the transmission line 301 in the direction A towards the end of the second portion 202 of the well pipe 210. As the tension-generating device 600 pulls the second end of the transmission line 301, the first axial load sleeve 302a is pressed up against the shoulder 218a of the well pipe 210, which prevents a translation movement of the transmission line 301, and instead generates tension in the transmission line 301.

In one embodiment of the invention, the second axial load sleeve 302b is welded or fixed to the transmission line 301 prior to inserting the transmission line into the well pipe 210. In such an embodiment, the diameter of the axial load sleeve 302b must be less than the diameter of the opening 239a and the sixth channel portion 237a of the third transmission line channel. In such an embodiment, since the diameter of the axial load sleeve 302b is less than the diameter of the sixth channel portion 237a to permit insertion of the axial load sleeve 302b into the sixth channel portion 237a, the axial load sleeve 302b, alone, is an insufficient structure to maintain tension in the transmission line 301, since the axial load sleeve 302b would be freely slideable within the sixth channel portion 237a.

While an embodiment has been described in which the transmission line 301 is inserted into first channel 126a, through the second channel 217a, through the center portion 213, and through the sixth channel portion 237a into the fifth channel portion 236a, embodiments of the invention also encompass other methods of inserting the transmission line 301 into the transmission line channels. For example, in one embodiment, a transmission line is inserted into the center portion 230 of the main cavity, one end is inserted into the second channel 217a via the opening 219a and the opposite end is inserted into the sixth channel portion 237a via the opening 239a.

FIG. 7A illustrates the application of a constriction sleeve 701 to the axial load sleeve 302b to maintain tension in the transmission line 301. In operation, the tension-generating device 600 pulls the transmission line in the direction A, and the constriction sleeve 701 and cone sleeve 702 are inserted onto the transmission line 301. The constriction sleeve 701 and cone sleeve 702 may be pushed onto the transmission line by a positioning sleeve 703.

Figure 7B:
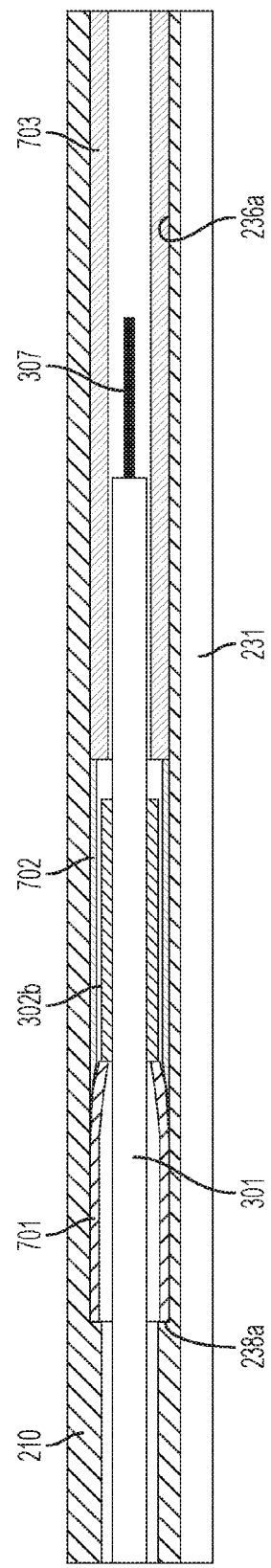
FIG. 7B illustrates a constriction of a constriction sleeve according to an embodiment of the invention.
Figure 7C:
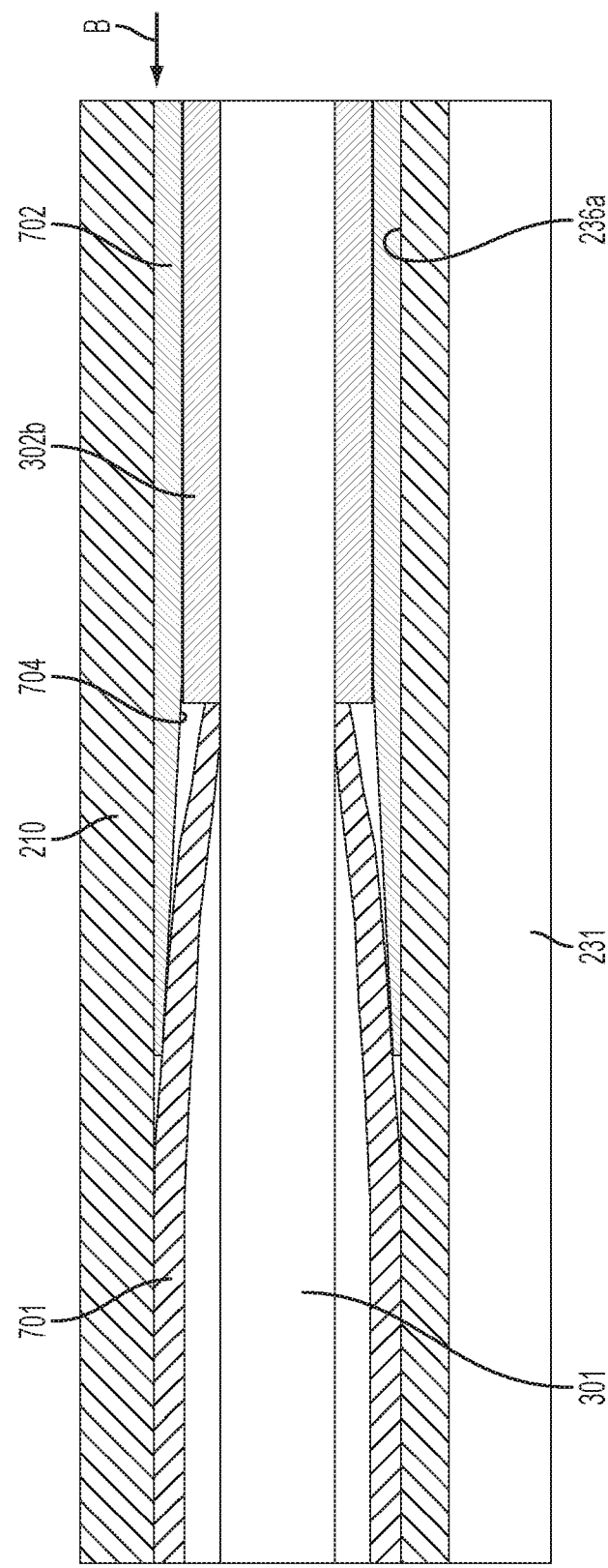
FIG. 7C illustrates the constriction of the constriction sleeve according to an embodiment of the invention.

FIGS. 7B and 7C illustrate the constriction sleeve 701 and cone sleeve 702 in greater detail. FIG. 7B illustrates a state of the transmission line 301 that has been pulled in the direction A until the second axial load sleeve 302b is located at least a predetermined distance from the shoulder 238a, where the predetermined distance corresponds to a length of the constriction sleeve 701. The constriction sleeve 701 is then slid over the outside surface of the axial load sleeve 302b and linearly between the axial load sleeve 302b and the shoulder 238a. The cone sleeve 702 is then slid over the outer surface of the axial load sleeve 302b. As illustrated in FIG. 7C, the cone sleeve 702 has a slanted inner surface 704, such that as the cone sleeve 702 is slid in the direction B, the slanted inner surface 704 causes the constriction sleeve 701 to constrict radially inward. Consequently, as illustrated in FIG. 7B, an end of the constriction sleeve facing the shoulder 238a has a diameter greater than the diameter of the fifth channel portion 236a, and the end of the constriction sleeve facing the axial load sleeve 302b has an inner diameter less than an outer diameter of the axial load sleeve 302b.

As a result, when the tension generating tool 600 releases its grip of the transmission line 301, the wider end of the constriction sleeve 701 presses against the shoulder 238a and the narrower end transmits an axial force, corresponding to the tension of the transmission line 301, to the second axial load sleeve 302b. Also illustrated in FIG. 7B is a conductive pin or lead 307 extending from the end of the transmission line 301 configured to contact a conductive receptacle of an adjacent connector to transmit data and/or power along the transmission line 301.

Figure 8:
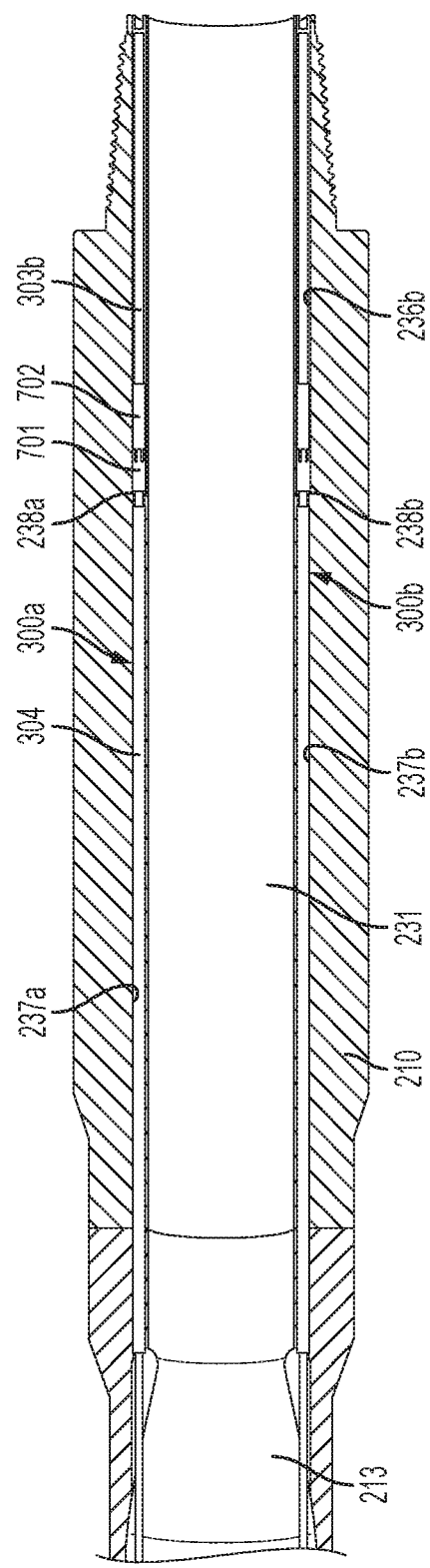
FIG. 8 illustrates a well pipe assembly having the tension-generating device removed according to an embodiment of the invention.

As illustrated in FIG. 8, the tension-generating device 600 is removed from the well pipe 210 and the constriction sleeve 701 is held against the shoulder 138a by the tension of the transmission line 301. The positioning sleeve 703 may also be removed from the third transmission line channel, and a sealing sleeve 303b may be inserted over the transmission line 301 to prevent fluid from flowing into the fifth channel portion 236a. Also, as illustrated in FIG. 8, a second transmission line assembly 300b may be inserted into the fourth transmission line channel including the seventh and eighth channel portions 236b and 237b by the same manner as the first transmission line assembly 300a.

While FIG. 6 illustrates only one tension-generating device 600 being inserted into the well pipe 210, embodiments of the invention encompass any number of tension-generating devices 600, or any number of grip portions 601 to grip any number of transmission lines 301 simultaneously. For example, in an embodiment in which two transmission line assemblies 300a and 300b pass through the well pipe 210, the tension-generating device 600 may have two grip portions 601 to simultaneously grip the first and second transmission line assemblies 300a and 300b.

Figure 9:
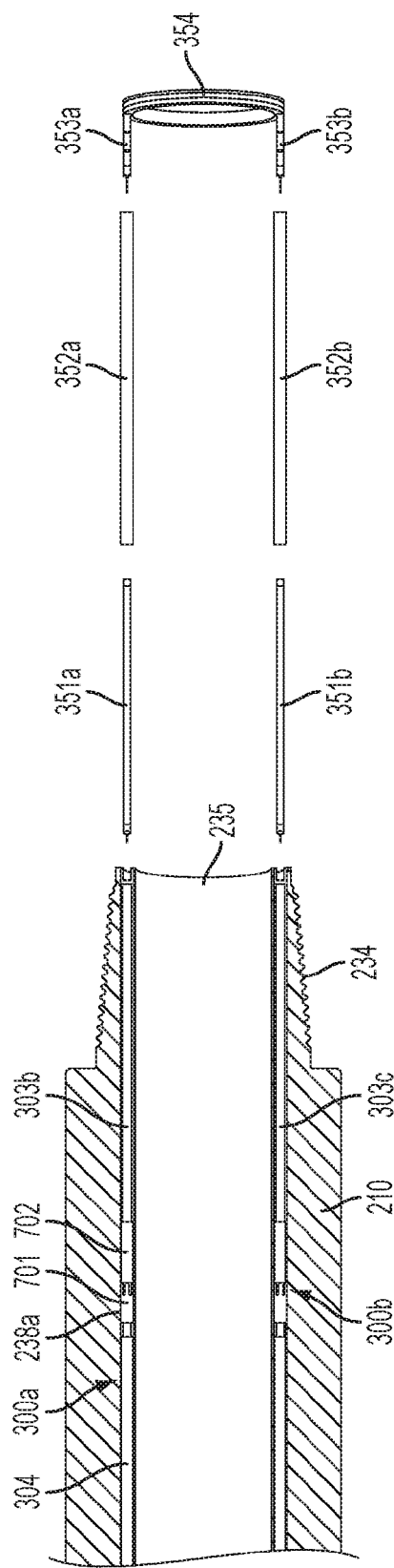
FIG. 9 illustrates the insertion of connectors and a transmission element into the well pipe according to an embodiment of the invention.

FIG. 9 illustrates completion of the transmission system by inserting a first length-adjustable connector 351a into the second sealing sleeve 303b, inserting a first guiding sleeve 352a around an outside of the second sealing sleeve 303b, and inserting a first transmission line connector 353a of a transmission element 354 into the guiding sleeve 352a and sealing sleeve 303b to contact the length-adjustable connector 351a. In embodiments of the invention, data and/or power signals may be transmitted via the transmission line 301, length-adjustable connector 351a and transmission line connector 353a to the transmission element 354. The second transmission line assembly 300b may also be provided with a length-adjustable connector 351b, guiding sleeve 352b and transmission line connector 353b.

Figure 10:
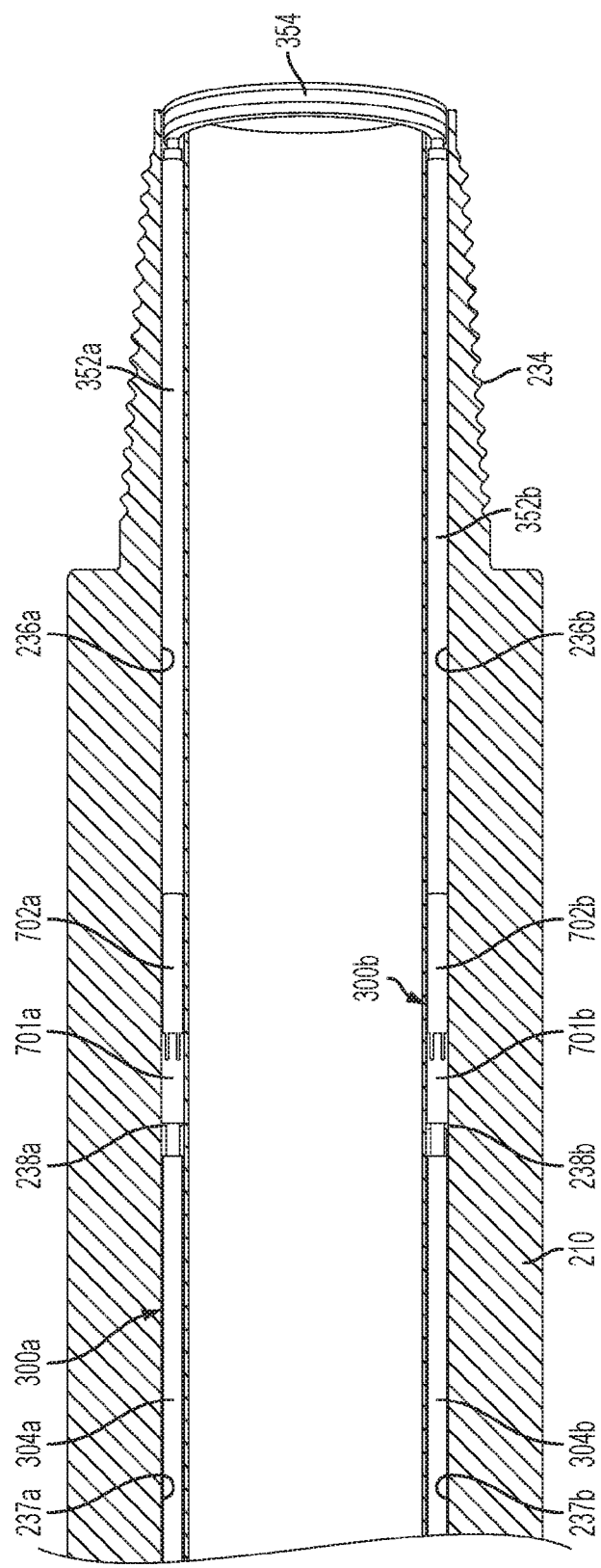
FIG. 10 illustrates the final configuration of the transmission line assembly, connectors and transmission element according to an embodiment of the invention.

FIG. 10 illustrates the final tensioned state of the first and second transmission line assemblies 300a and 300b, including constriction sleeves 701a and 701b, cone sleeves 702a and 702b, guiding sleeves 352a and 352b, and a transmission element 354, which is configured to transmit power or data to an adjacent well pipe, such as by electromagnetism.

As illustrated in FIGS. 1 to 10, embodiments of the invention relate to a system for providing tension in a transmission line of a well pipe, in which a load sleeve is attached to a first end of a transmission line, the transmission line is inserted into a transmission line channel of the well pipe by its second end, the second end is pulled through the transmission line channel, and an axial load-supporting assembly is provided on the second end. In FIGS. 2A-10, the axial-load supporting assembly includes an axial load sleeve welded to the transmission line that is attached to the transmission line prior to inserting the transmission line into the well pipe, and a constriction sleeve that is inserted over the axial load sleeve after insertion of the transmission line through the well pipe. However, embodiments of the invention are not limited to this configuration or method, and any type of axial load-supporting assembly may be used to maintain tension along a transmission line.

FIGS. 11 to 17 illustrate an axial load-supporting assembly according to another embodiment of the invention.

Figure 11:
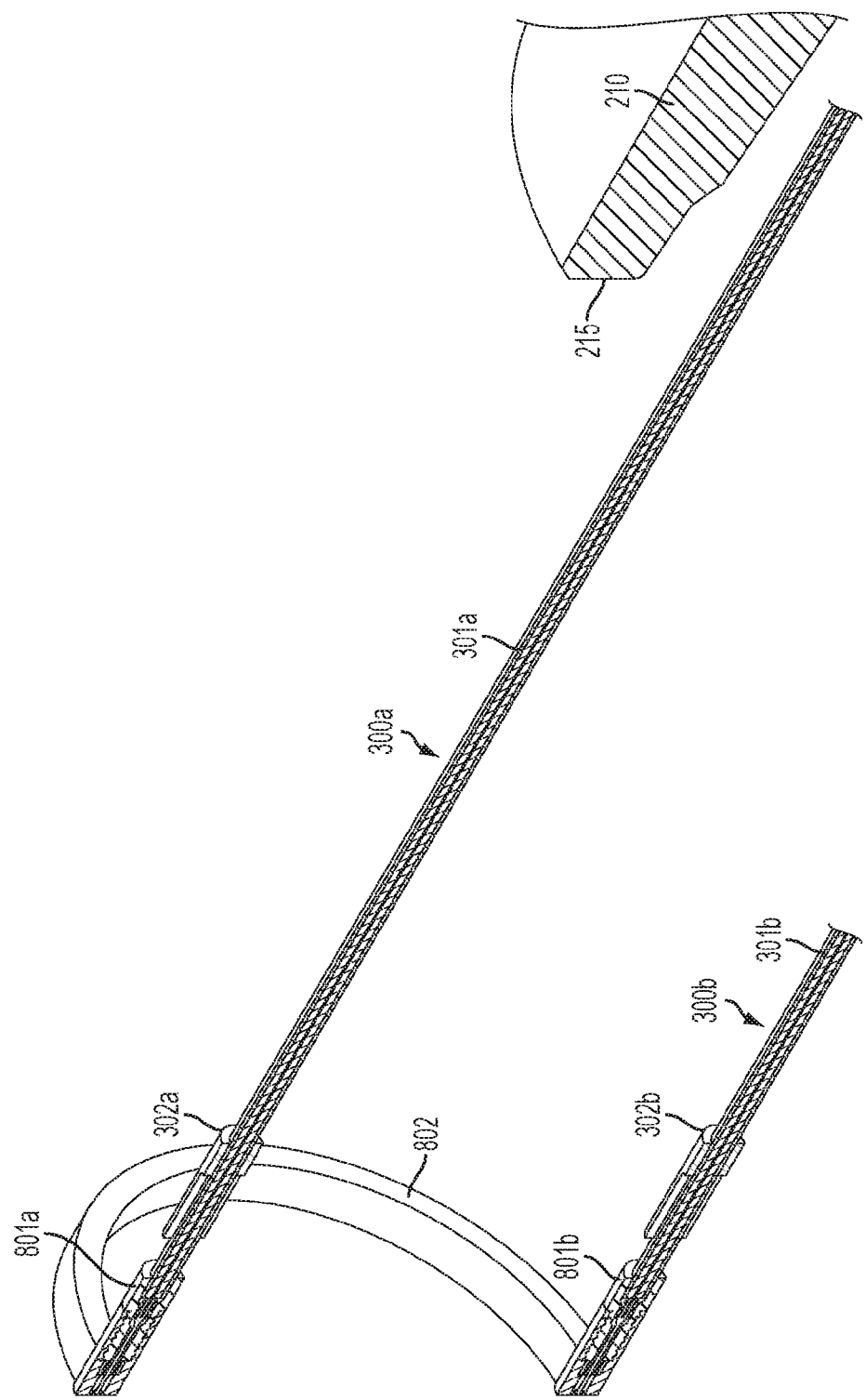
FIG. 11 illustrates the application of axial load sleeves and a transmission element on to an end of two transmission lines according to another embodiment of the invention.

As illustrated in FIG. 11, a first transmission line assembly 300a includes a transmission line 301a and an axial load sleeve 302a. The axial load sleeve 302a may be welded onto the transmission line 301a. Similarly, a second transmission line assembly 300b includes a transmission line 301b and an axial load sleeve 302b, which may be welded to the transmission line 301b. The transmission line assemblies 300a and 300b may also include welded sealing sleeves 801a and 801b. A transmission element 802 is connected to the transmission lines 301a and 301b.

Figure 12:
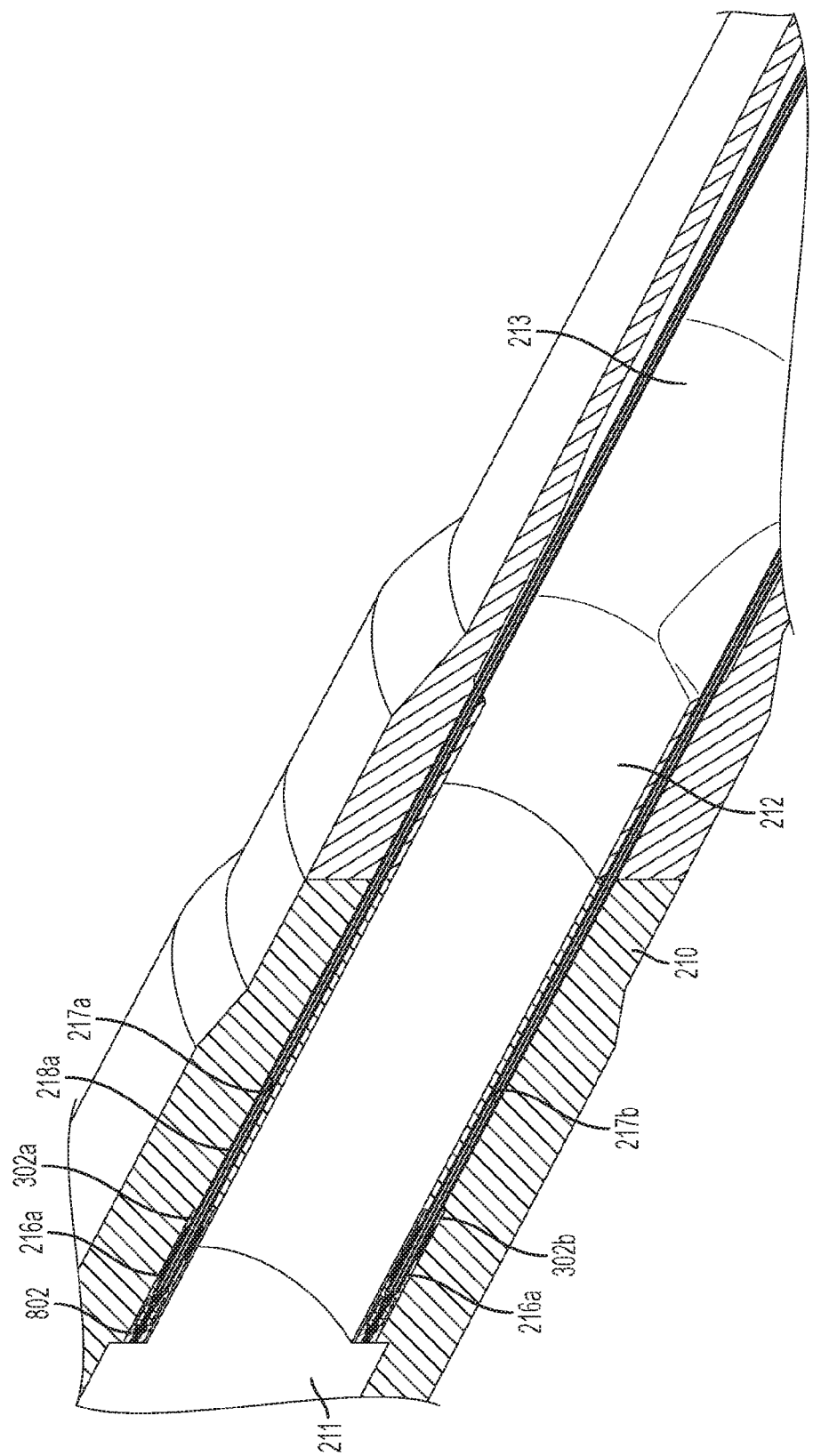
FIG. 12 illustrates insertion of the transmission lines into the well pipe according to an embodiment of the invention.

Referring to FIGS. 11 and 12, the transmission line assemblies 300a and 300b are inserted into the opening defined by the end surface 215 of the pipe 202 to pass into and through the first, second, third and fourth channel portions 216a, 217a, 216b and 217b, respectively. The transmission line assemblies 300a and 300b are inserted into the well pipe 210 until the axial load sleeve 302a contacts the shoulder 218a and the axial load sleeve 302b contacts the shoulder 218b.

Figure 13:
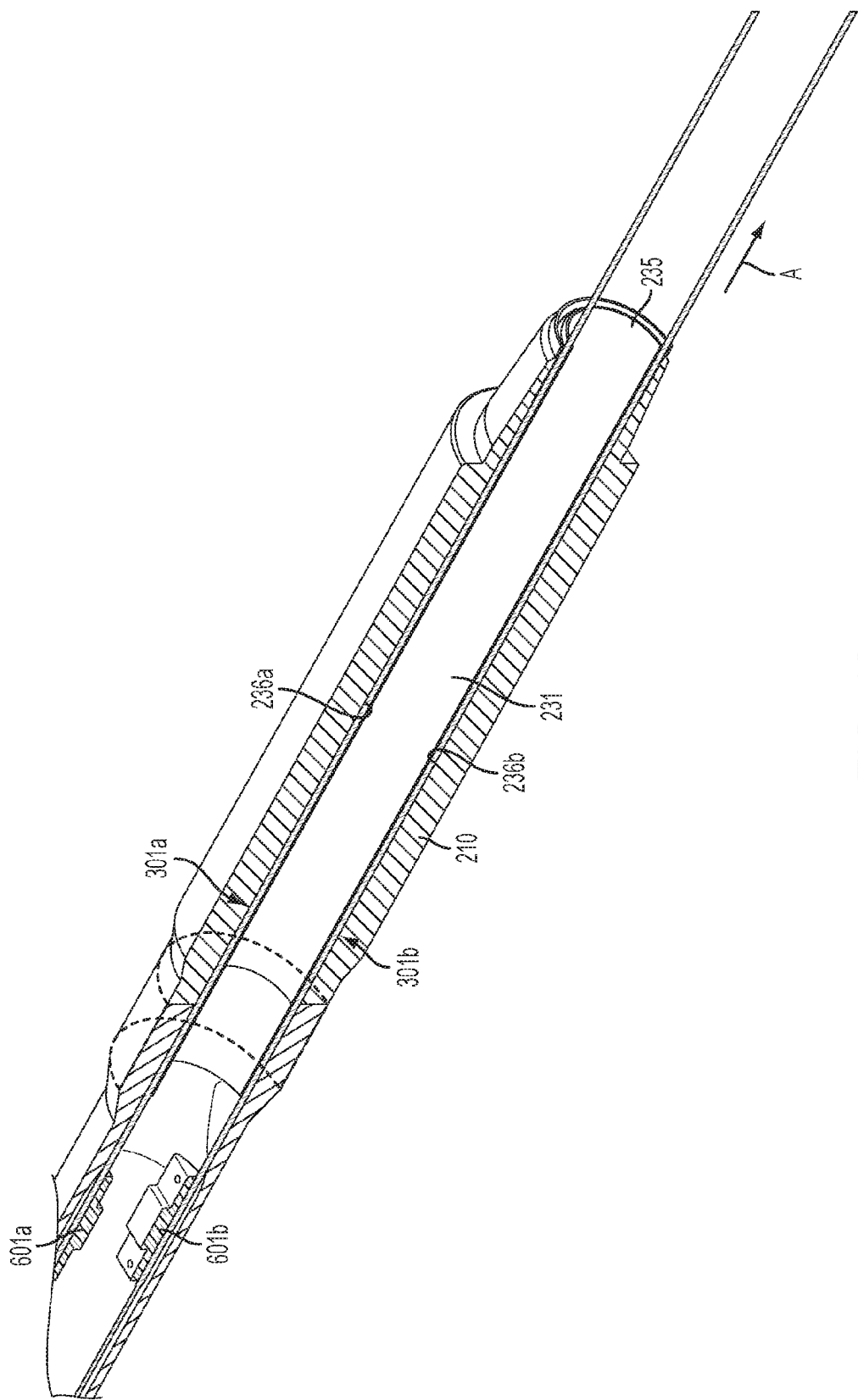
FIG. 13 illustrates applying tension to the transmission lines with a tension-generating device according to an embodiment of the invention.

Referring to FIG. 13, grip portions 601a and 601b are inserted into the opening defined by the end surface 235 of the well pipe 210 and connected to the first and second transmission lines 301a and 301b to grip the first and second transmission lines 301a and 301b and to pull the first and second transmission lines 301a and 301b in the direction A towards the end surface 235 of the well pipe 210. In one embodiment, the ends of the transmission lines 301a and 301b extend past the end surface 235 of the well pipe 210. The ends of the transmission lines 301a and 301b may be cut to a desired length.

Figure 14:
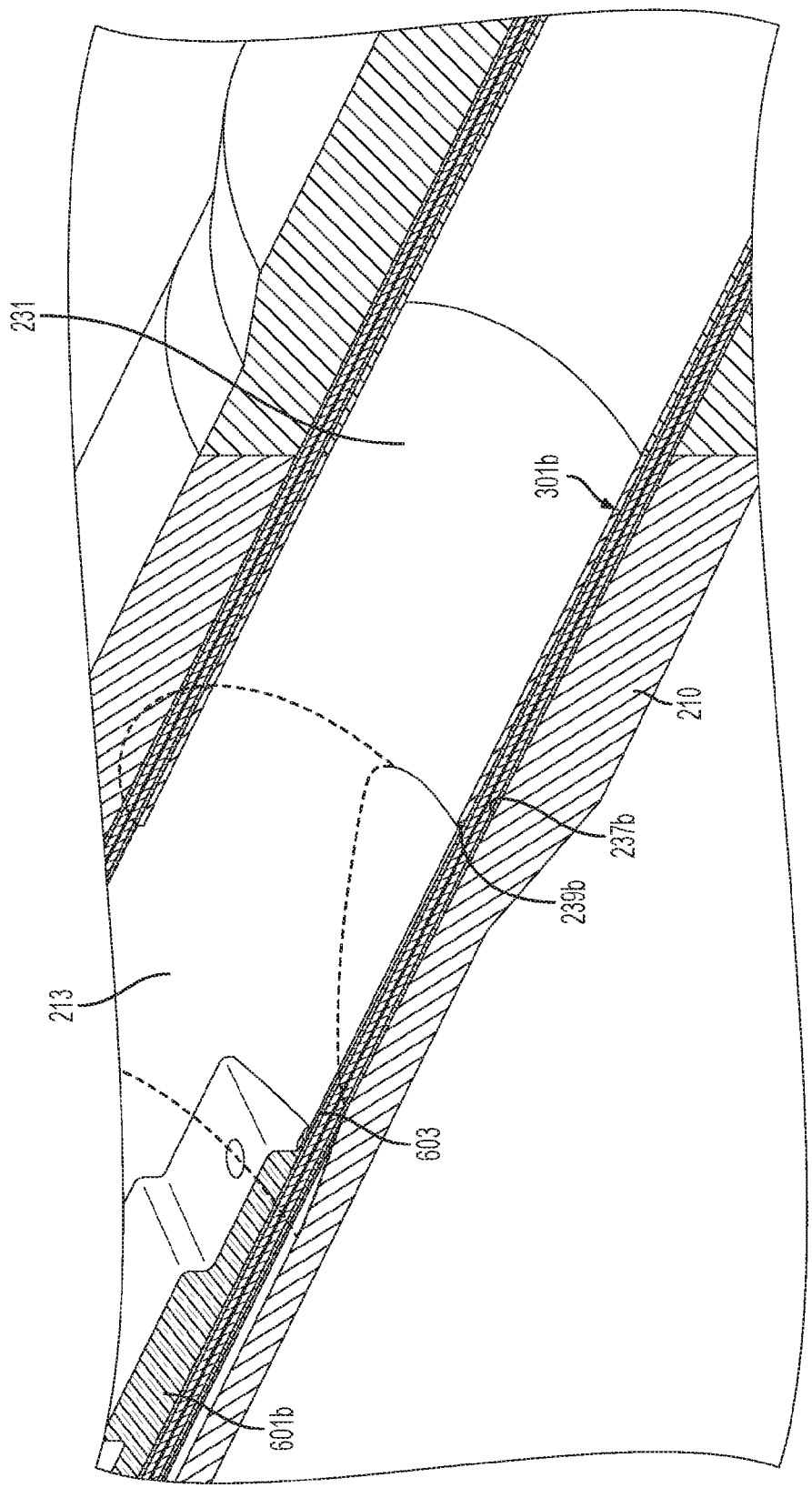
FIG. 14 illustrates a pushing sleeve according to an embodiment of the invention.
Figure 15:
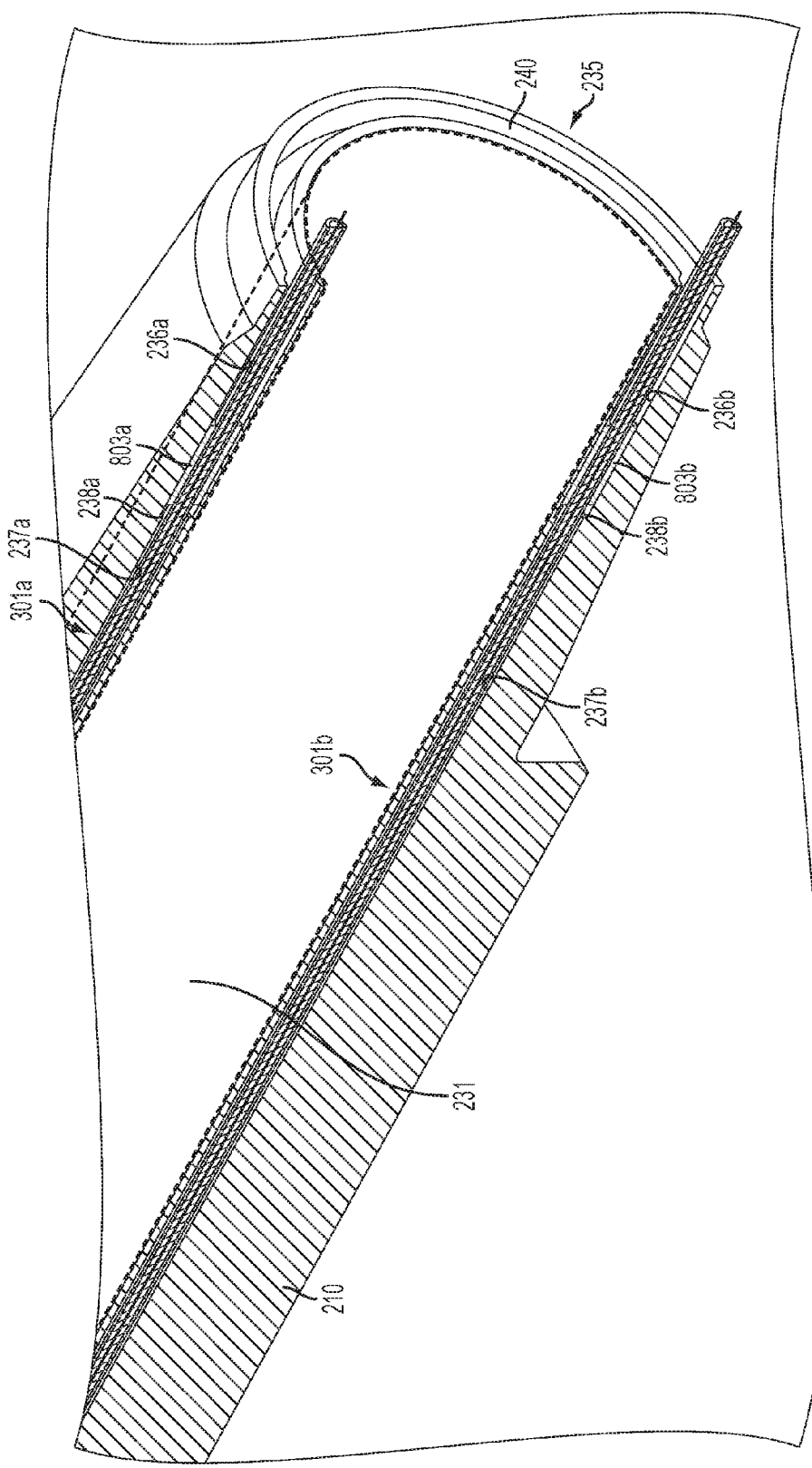
FIG. 15 illustrates insertion of axial load sleeves onto an end of two transmission lines according to an embodiment of the invention.

FIG. 14 illustrates a pushing sleeve 603 that is positioned around the transmission line 301b. As illustrated in FIG. 15, the axial load sleeves 803a and 803b are affixed onto the transmission lines 301a and 301b, respectively, after insertion of the transmission lines 301a and 301b through the well pipe 210. The axial load sleeves 803a and 803b are fixed to the transmission lines 301a and 301b, such that when an axial load is applied to the axial load sleeves 803a and 803b, the axial load sleeves 803a and 803a maintain their position on the transmission lines 301a and 301b and transmit the load to the transmission lines 301a and 301b to apply tension to the transmission lines 301a and 301b.

In one embodiment, as illustrated in FIG. 15, the axial load sleeves 803a and 803b are attached to the transmission lines 301a and 301b to abut the shoulders 238a and 238b. In another embodiment, the axial load sleeves 803a and 803b may be attached to the transmission lines 301a and 301b at a predetermined distance apart from the shoulders 238a and 238b.

The axial load sleeves 803a and 803b may be made of any material or combination of materials. For example, in one embodiment the axial load sleeves 803a and 803b are made from a shape memory material such that when heat is applied to the axial load sleeves 803a and 803b after the axial load sleeves 803a and 803b are slid over the transmission lines 301a and 301b, the axial load sleeves 803a and 803b constrict to lock onto the transmission lines 301a and 301b. In another embodiment, the axial load sleeves 803a and 803b are welded to the transmission lines 301a and 301b. In another embodiment, the axial load sleeves 803a and 803b include a welded component that is welded directly to the transmission lines 301a and 301b and that has a diameter less than the fifth and seventh channel portions 236a and 236b of the well pipe 210, respectively. A shape memory component may be slid over the welded components and heated to constrict around the transmission lines 301a and 301b. The shape memory components may have a diameter greater than the fifth and seventh channel portions 236a and 236b, such that the shape memory components transfer a tension force from the shoulders 238a and 238b to the transmission line 301.

Figure 16:
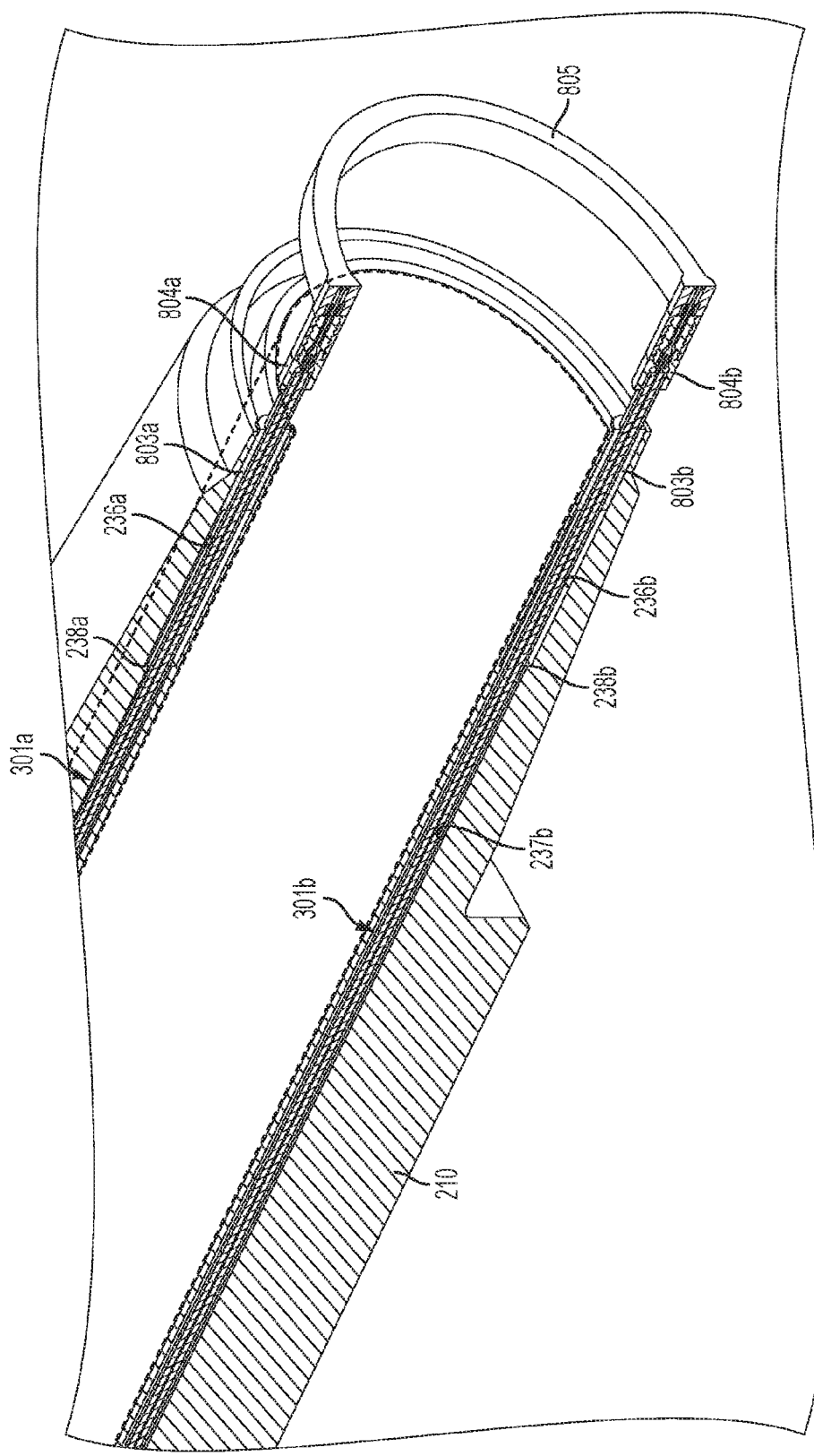
FIG. 16 illustrates attaching sealing sleeves and a transmission element onto the transmission lines according to an embodiment of the invention.

Referring to FIG. 16, welded sealing sleeves 804a and 804b are affixed to the transmission lines 301a and 301b by welding the sealing sleeves 804a and 804b onto the transmission lines 301a and 301b, and a transmission element 805 is attached to the end of the transmission lines 301a and 301b to be in electrical communication with the transmission lines 301a and 301b. While not illustrated in FIG. 16, the tension-generating device 600 (illustrated in FIG. 6) may maintain a predetermined tension level on the transmission lines 301a and 301b while the sealing sleeves 804a and 804b and the transmission element 805 are connected to the transmission lines 301a and 301b. The predetermined tension level is sufficient to move the axial load sleeves 803a and 803b away from the shoulders 238a and 238b.

Figure 17:
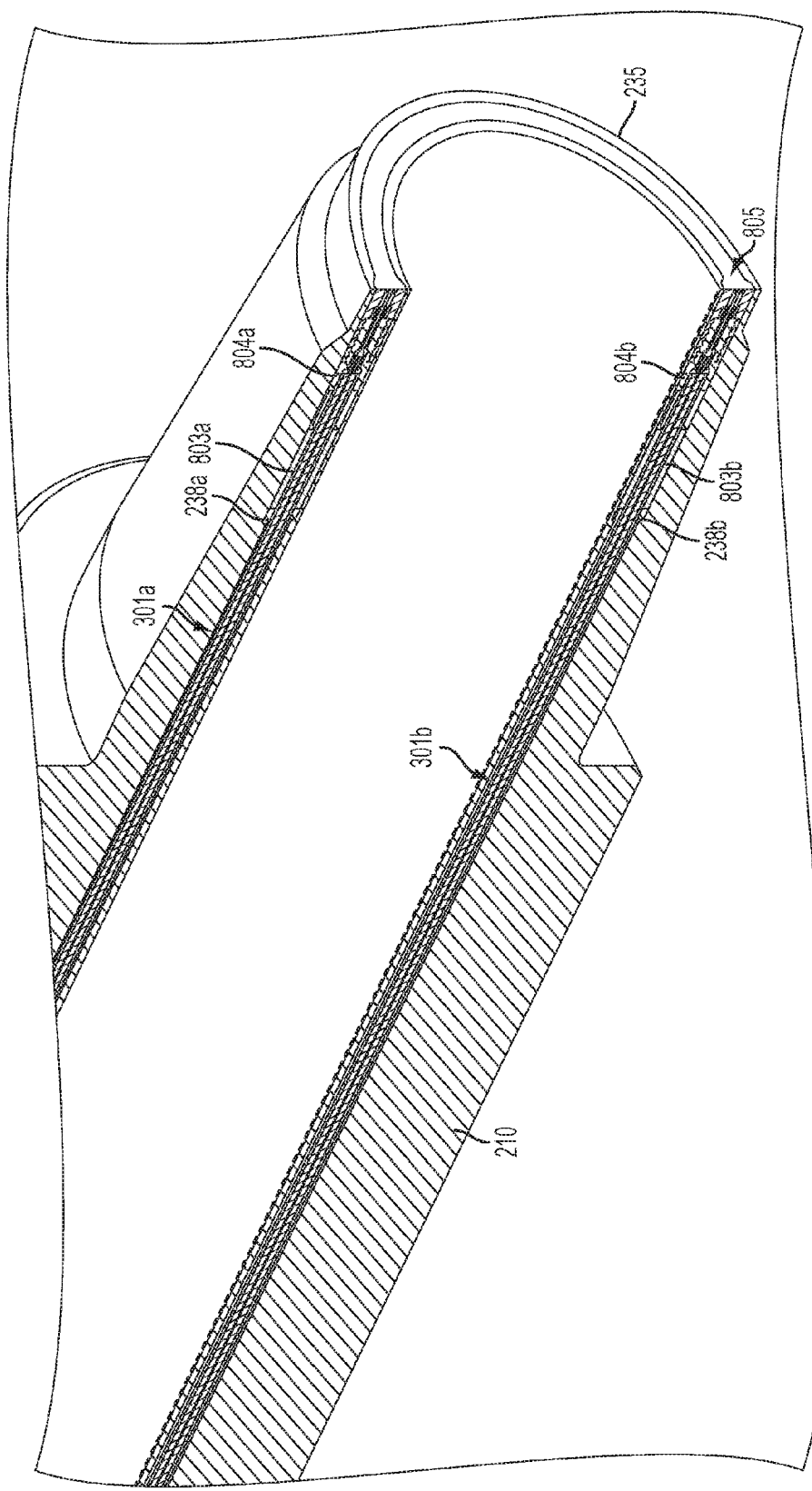
FIG. 17 illustrates the final configuration of the transmission lines, axial load sleeves and transmission element according to an embodiment of the invention.

FIG. 17 illustrates the final assembly of the second end 202 of the well pipe 210 according to an embodiment of the invention. After the axial load sleeves 803a and 803b, the sealing sleeves 804a and 804b and the transmission element 805 are affixed to the transmission lines 301a and 301b, the grip portions (601a and 601b of FIG. 13) are removed from the transmission lines 301a and 301b, and the tension-generating device 600 is removed from the well pipe 210. The tension of the transmission lines 301a and 301b pulls the axial load sleeves 803a and 803b against the shoulders 238a and 238b to maintain a tension level along the transmission lines 301a and 301b.

In one embodiment of the invention, a first tension level is applied to the transmission lines 301a and 301b to affix one or more of the axial load sleeves 803a and 803b, sealing sleeves 804a and 804b or transmission element 805 to the transmission lines 301a and 301b. The first tension level is applied by pulling the transmission lines 301a and 301b with a tension-generating device 600 inserted into a main cavity of the well pipe 210. In a completed state, a second tension level is maintained on the transmission lines 301a and 301b, and the second tension level is less than the first tension level. The second tension level is maintained by the axial load sleeves 803a and 803b pressing up against the shoulders 238a and 238b. In other words, the second tension level is sufficient to keep the axial load sleeves 803a and 803b in contact with the shoulders 238a and 238b, even though the second tension level is less than the first tension level.

While embodiments of the invention have been described with respect to axial load sleeves, constriction sleeves and shape memory rings or sleeves, embodiments of the invention are not limited to these mechanisms for maintaining tension in a transmission line of a well pipe. Instead, embodiments encompass any mechanism for maintaining tension, including components that are welded to the transmission line either before or after inserting the transmission line into a well pipe, any mechanism that constricts around the transmission lines upon receipt of a mechanical force, any mechanism that constricts around the transmission lines upon receipt of a predetermined level of heat, a chemically-initiated mechanism, or any other mechanism capable of constricting and maintaining a tension force between a shoulder of a transmission line cavity and a welded axial load sleeve.

In addition, while embodiments of the invention are described herein with co-axially aligned transmission line channels, embodiments also encompass transmission line channels that are not axially aligned.

Figure 18:
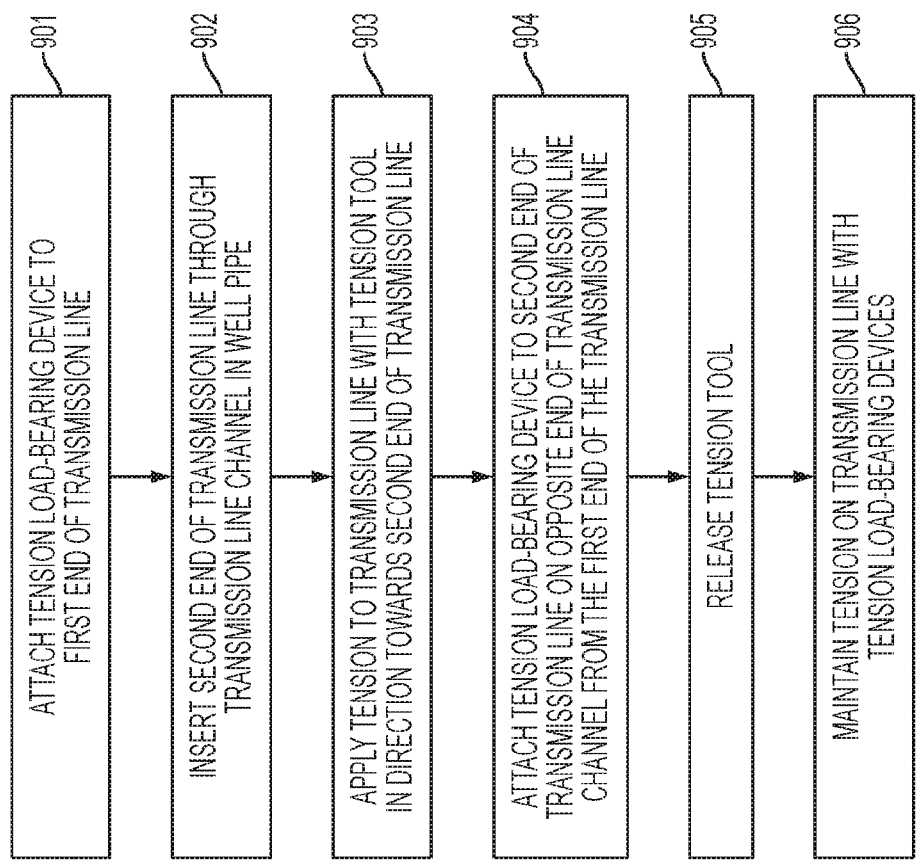
FIG. 18 illustrates a flow diagram of a method according to an embodiment of the invention.

FIG. 18 is a flow diagram of a method of applying a load to a transmission line according to an embodiment of the invention.

The method includes, in block 901, attaching a tension load bearing mechanism to the first end of a transmission line. The tension load bearing mechanism may be a sleeve that slides over the surface of the transmission line and may be welded or otherwise permanently attached to the transmission line. The tension load bearing mechanism is any mechanism that fits within a transmission line cavity of a well pipe and has a diameter sufficiently large that the tension load bearing mechanism abuts a shoulder in the transmission line cavity and maintains tension on the transmission line when a tension force is applied along the transmission line.

In block 902, the second end of the transmission line is inserted through the transmission line channel into the well pipe. In block 903, tension is applied to the transmission line with a tension-generating tool. In one embodiment, the tension-generating tool is inserted into the second end of the well pipe opposite the first end into which the transmission line is inserted. The tension-generating tool may grip the transmission line and pull the transmission line in a direction from the first end towards the second end of the transmission line. As a result of the tension-generating force of the tension-generating tool, the load bearing mechanism on the first end of the transmission line abuts the shoulder in the transmission line cavity and the tension is generated in the transmission line.

In block 904, a tension load bearing mechanism is attached to the second end of the transmission line on an opposite side of the transmission line from the first end of the transmission line. In one embodiment, the tension load bearing mechanism is attached after applying the tension to the transmission line in block 903. In another embodiment, one component of the tension load bearing mechanism is attached to the transmission line prior to applying the load, and another component is attached after applying the load. In one embodiment, the prior-applied component is a welded sleeve having a diameter smaller than the diameters of the transmission line channels in the well pipe, and the later-applied component is a constricting component that slides over the previously-applied component and constricts. The later-applied component may have a diameter larger than the previously-applied component, and may transfer a tension force from a shoulder of the transmission line channel to the prior-applied component.

In block 905, the tension-generating tool releases the transmission line. In block 906, tension is maintained on the transmission line by the tension load bearing mechanisms at each end of the transmission line. In particular, each of the tension load bearing mechanisms is held in place by a respective shoulder in the transmission line channels of the well pipe.

As discussed above, and with reference to FIG. 1, in one embodiment, the transmission line 150 is inserted into one of the first transmission line cavity 130 and the second transmission line cavity 140, through the center cavity 120 and into the other one of the first and second transmission line cavities 130 and 140. In such an embodiment, a diameter of the first or second tension-load-supporting mechanisms 151 or 152 that is transmitted through each of the cavities 120, 130 and 140 must be less than each of the first and second transmission line cavities 130 and 140 to permit the passage of the first or second tension-load-supporting mechanism 152 or 152 through the transmission line cavities 130 and 140.

Figure 19:
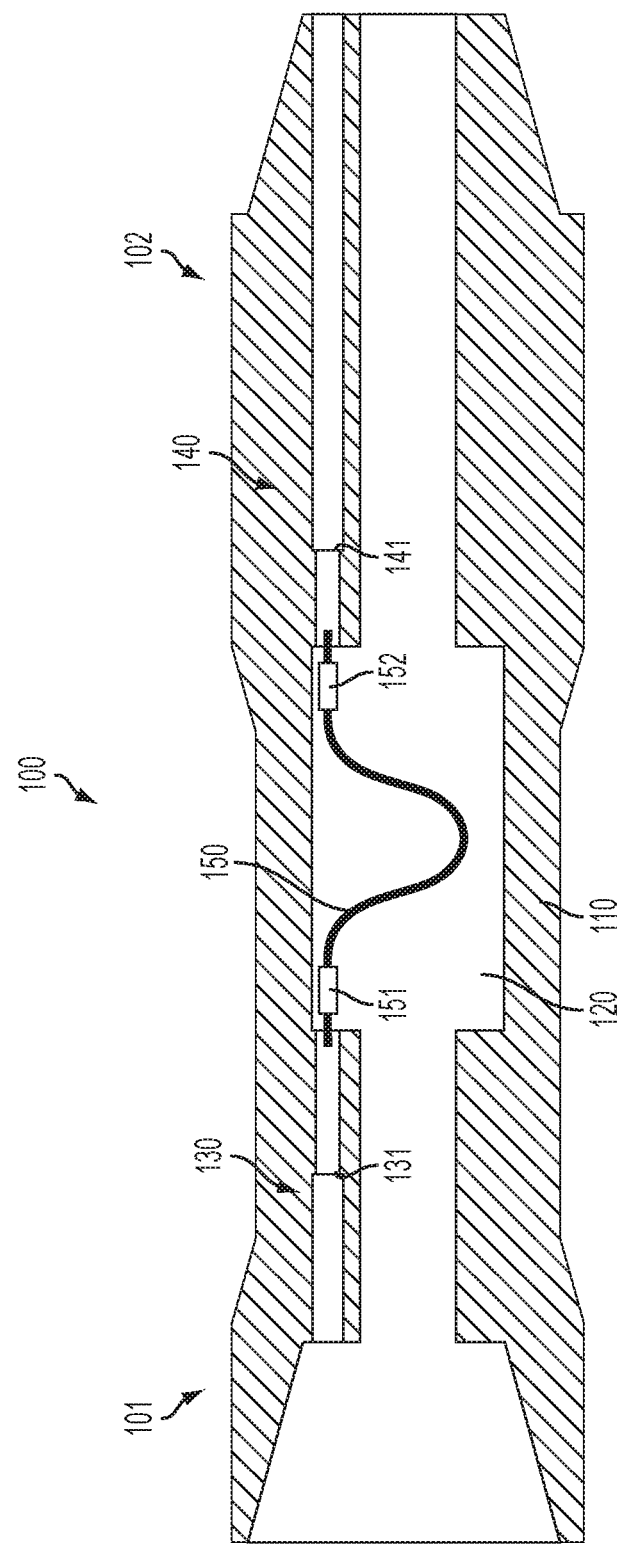
FIG. 19 illustrates a pipe segment according to another embodiment of the invention.

However, embodiments of the invention are not limited to such a configuration. For example, in another embodiment, illustrated in FIG. 19 and including the same reference numerals as in FIG. 1, the first and second tension-load-supporting mechanisms 151 and 152 are inserted, respectively, into the first and second transmission line cavities 130 and 140 from the main cavity 120 between the first and second transmission line cavities 130 and 140. In such an embodiment, the first and second tension-load-supporting mechanisms 151 and 152 need not be narrower than both of the first and second transmission line cavities 130 and 140, but instead the first and second tension-load-supporting mechanisms 151 and 152 only need to be narrower than the respective transmission line supporting cavity 130 or 140 into which the first or second tension-load-supporting mechanism 151 or 152 is inserted. For example, the first tension-load-supporting mechanism 151 may have a diameter less than a diameter of the first transmission line channel 130 and greater than the second transmission line channel 140, since the first tension-load-supporting mechanism 151 does not pass through the second transmission line channel 140 during insertion.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

What is claimed is:

1. A method of providing tension to a transmission line in a pipe, comprising:
   inserting a transmission line into a transmission line channel of a pipe, the transmission line having a first end and a second end, the transmission line being inserted into a first end of the pipe second-end-first, and the transmission line having a first tension-load-supporting mechanism attached to the first end of the transmission line;
   applying a first level of tension to the transmission line in the pipe;
   applying a second tension-load-supporting mechanism to the second end of the transmission line while the first level of tension is applied to the transmission line; and
   removing the first level of tension from the transmission line to maintain a second level of tension along the transmission line between the first and second tension-load-supporting mechanisms;
   wherein the transmission line is a data transmission line or a power transmission line.

2. The method of claim 1, wherein the second tension-load-supporting mechanism is a sealing sleeve, the sealing sleeve configured to isolate at least a portion of the transmission line channel from a fluid located in a main cavity of the pipe.

3. The method of claim 2, wherein the sealing sleeve is connected to the transmission line by one of a welding lid, a rubber seal, an elastomeric seal, a glue connection, a solder connection.

4. The method of claim 1, wherein the second level of tension is less than the first level of tension.

5. The method of claim 1, wherein applying the first level of tension includes inserting a tension generating device into a second end of the pipe opposite the first end.

6. The method of claim 5, wherein applying the first level of tension includes inserting the tension generating device into the transmission line channel.

7. The method of claim 5, wherein the tension generating device includes an extended portion and a grip portion, and
   applying the first level of tension to the transmission line includes gripping the transmission line with the grip portion of the tension generating device and pulling the transmission line in a direction from the first end of the transmission line to the second end of the transmission line while the first tension-load-supporting mechanism abuts a first shoulder in the transmission line channel.

8. The method of claim 1, wherein the first tension-load-supporting mechanism is a sleeve that is welded onto the transmission line.

9. The method of claim 1, wherein the transmission line channel has a first end at the first end of the pipe and a second end inside the pipe, and
   a diameter of the tension-load-supporting mechanism is less than a diameter of an opening at the second end of the transmission line channel.

10. The method of claim 1, wherein the second tension-load-supporting mechanism is a sleeve that is welded onto the transmission line after the tension is applied to the transmission line by the tension generating device.

11. The method of claim 1, wherein the second tension-load-supporting mechanism includes an axial load sleeve and a constricting sleeve, the axial load sleeve being attached to the transmission line and the axial load sleeve having a diameter less than the transmission line channel, and
   wherein applying the second tension-load-supporting mechanism to the transmission line comprises:
   sliding the constricting sleeve over the second load-supporting sleeve in a direction from the second end of the transmission line towards the first end of the transmission line; and
   constricting the constricting sleeve such that an inner diameter of the constricting sleeve adjacent to the axial load sleeve is less than an outer diameter of the axial load sleeve.

12. The method of claim 11, wherein constricting the constricting sleeve includes applying a force to an outer surface of the constricting sleeve with a cone sleeve having a slanted inner surface.

13. The method of claim 11, wherein the constricting sleeve is made of a shape memory material, and
   constricting the constricting sleeve includes applying heat to the constricting sleeve to change a shape or diameter of the constricting sleeve.

14. The method of claim 1, wherein inserting the transmission line into the transmission line channel of the pipe includes inserting a first transmission line into a first transmission line channel of the pipe and inserting a second transmission line into a second transmission line channel of the pipe, and
   the method further comprises:
   attaching a transmission element to the first ends of each of the first transmission line and the second transmission line prior to applying the first level of tension to the first transmission line and the second transmission line.

15. The method of claim 14, wherein applying the second tension-load-supporting mechanism to the second end of the transmission line includes applying the second tension-load-supporting mechanism to the second end of the first transmission line and applying a third tension-load-supporting mechanism to the second end of the second transmission line while the first level of tension is applied to the first transmission line and the second transmission line.

16. A pipe assembly, comprising:
   a pipe having a main cavity extending through the pipe along a longitudinal axis and a transmission line channel located radially outward from the main cavity and extending through the pipe substantially parallel to the longitudinal axis, the transmission line channel having a first shoulder at a first end of the transmission line channel and a second shoulder at a second end of the transmission line channel; and
   an electrical transmission line assembly including a transmission line extending along the transmission line channel, a first tension-load-bearing mechanism at a first end of the transmission line and a second tension-load-bearing mechanism at a second end of the transmission line, the first tension-load-bearing mechanism and the second tension-load-bearing mechanism configured to press against the first shoulder and the second shoulder, respectively, to maintain a tension along the transmission line;
   wherein the first tension-load-bearing mechanism includes a first axial load sleeve welded to the transmission line and having an outer diameter greater than an inner diameter of the first shoulder; and
   wherein the transmission line is a data transmission line or a power transmission line.

17. The pipe assembly of claim 16, wherein the second tension-load-bearing mechanism includes a second axial load sleeve affixed to the transmission line and having an outer diameter greater than an inner diameter of the second shoulder.

18. The pipe assembly of claim 17, wherein the second axial load sleeve is made of a shape memory material configured to constrict around the transmission line based on heat being applied to the second axial load sleeve.

19. The pipe assembly of claim 16, wherein the second tension-load-bearing mechanism includes a second axial load sleeve welded to the transmission line and having an outer diameter less than an inner diameter of the second shoulder, and a constriction sleeve positioned between the second axial load sleeve and the second shoulder, the constriction sleeve having an outer diameter at a first end adjacent to the second shoulder greater than an inner diameter of the second shoulder and having an inner diameter at a second end adjacent to the second axial load sleeve less than an outer diameter of the second axial load sleeve.

20. The pipe assembly of claim 19, wherein the constriction sleeve is configured to constrict at the second end based on a mechanical force being applied to an outer surface of the second end of the constriction sleeve by a cone sleeve having a slanted inner surface.

21. The pipe assembly of claim 19, wherein the constriction sleeve is made of a shape memory material and the second end of the constriction sleeve is configured to constrict towards the transmission line based on heat being applied to the constriction sleeve.

* * * * *